A. Taylor's Last
2885
Reissued
Feb. 25 1868
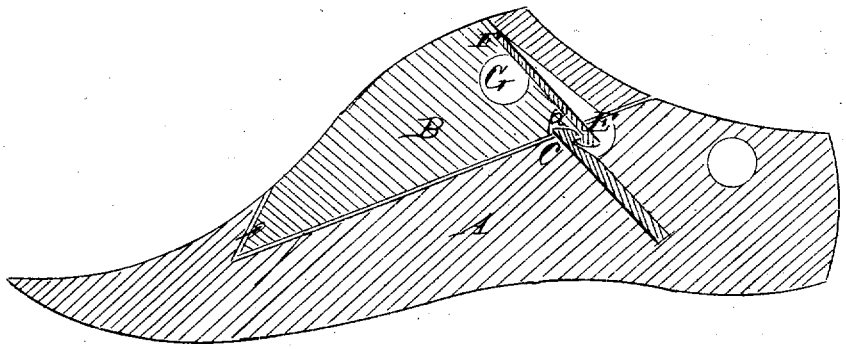
WITNESSES
H. C. Ashcettes
Theo. Inche
INVENTOR
A. Taylor
per Munn & Co
attorneys

UNITED STATES PATENT OFFICE.

AMBROSE TAYLOR, OF OSAWATOMIE, KANSAS.

IMPROVEMENT IN LASTS.

Specification forming part of Letters Patent No. 70,648, dated November 5, 1867; Reissue No. 2,885, dated February 25, 1868.

*To all whom it may concern:*

Be it known that I, AMBROSE TAYLOR, of Osawatomie, in the county of Miami and State of Kansas, have invented a new and useful Improvement in Lasts; and I do hereby declare that the following is a full, clear, and exact description thereof, which will enable others skilled in the art to make and use the same, reference being had to the accompanying drawings, forming part of this specification.

The present invention relates to a fastening for the blocks to boot and shoe lasts. Heretofore the block has been secured to the last by means of a tack or nail driven through the heel portion of the block into the last. This tack frequently becomes loose, and thus detached, causing much trouble. Again, the tack is oftentimes driven so far into the block as to require much time to withdraw it; and, furthermore, owing to such mode of attachment, as it was not convenient for use, the blocks and lasts were allowed to become scattered, thus in that respect causing much trouble and annoyance. Therefore, the object of the present invention is to provide some simple device as a fastening for the block to the last, whether the last be in use or not, and which can be released or unfastened in the most ready and simple manner.

In the accompanying plate of drawings my improvement in lasts is illustrated, the figure being a central section through the last and its block in the direction of their length.

A in the drawings represents a last, and B its block, which heretofore has been secured by the insertion and driving of a nail through it into the last A. To and in the upper side of the last A is secured a hook, C, which projects above the surface of the said upper side.

E is a spring-hook, inserted by its stem or shank portion F in and through the block B in such manner as to have a play therein, passing by the usual cross-hole, G, in the same, for the insertion of a hook to remove the block when the last is in a boot or shoe. The hook C extends upward within a recess, *a*, in the under side of the block B, as shown clearly in the drawings, and by this means it will be seen that when the block is fitted or placed upon the last the spring-hook E will engage with the hook C and secure the block down upon the last, while the extension of hook C up within the recess *a* in the block B prevents any lateral or backward movement of said block.

To detach the block from the last the ordinary hook is used, which, by first being inserted in the hole G and then pulling upon it, so moves the hook E as to disengage it from the hook in the last.

From the above description it is plainly apparent that my improved fastener is simple, cheap, effective, and practical, as well as most desirable and advantageous for use.

Having described my invention, I claim as new and desire to secure by Letters Patent—

1. The spring-hook E, secured by its shank F in the block B, and engaging with the hook C, set in the last A, all constructed and arranged to operate as herein set forth, for the purpose specified.

2. The prevention of lateral or backward movement of the block B by having the hook C extend upward above the surface of the upper side of the last and within a recess in the under surface of the block B, substantially as shown and described.

The above specification of my invention signed by me this 16th day of December, 1867.

AMBROSE TAYLOR.

Witnesses:

F. A. GUCALLY,
W. T. M. WILLIAMS,
R. E. WILLIAMS.